Patented Aug. 1, 1933

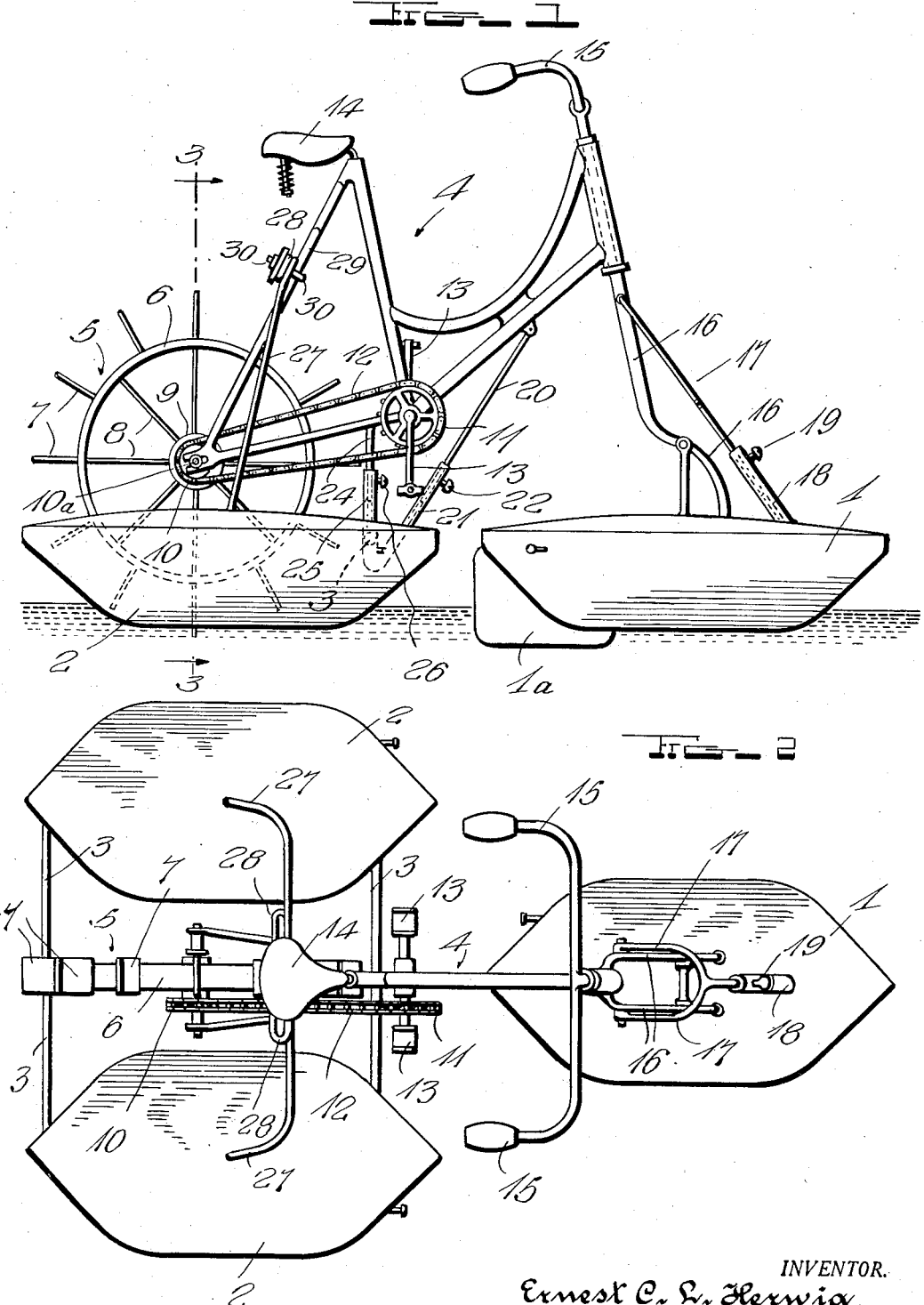

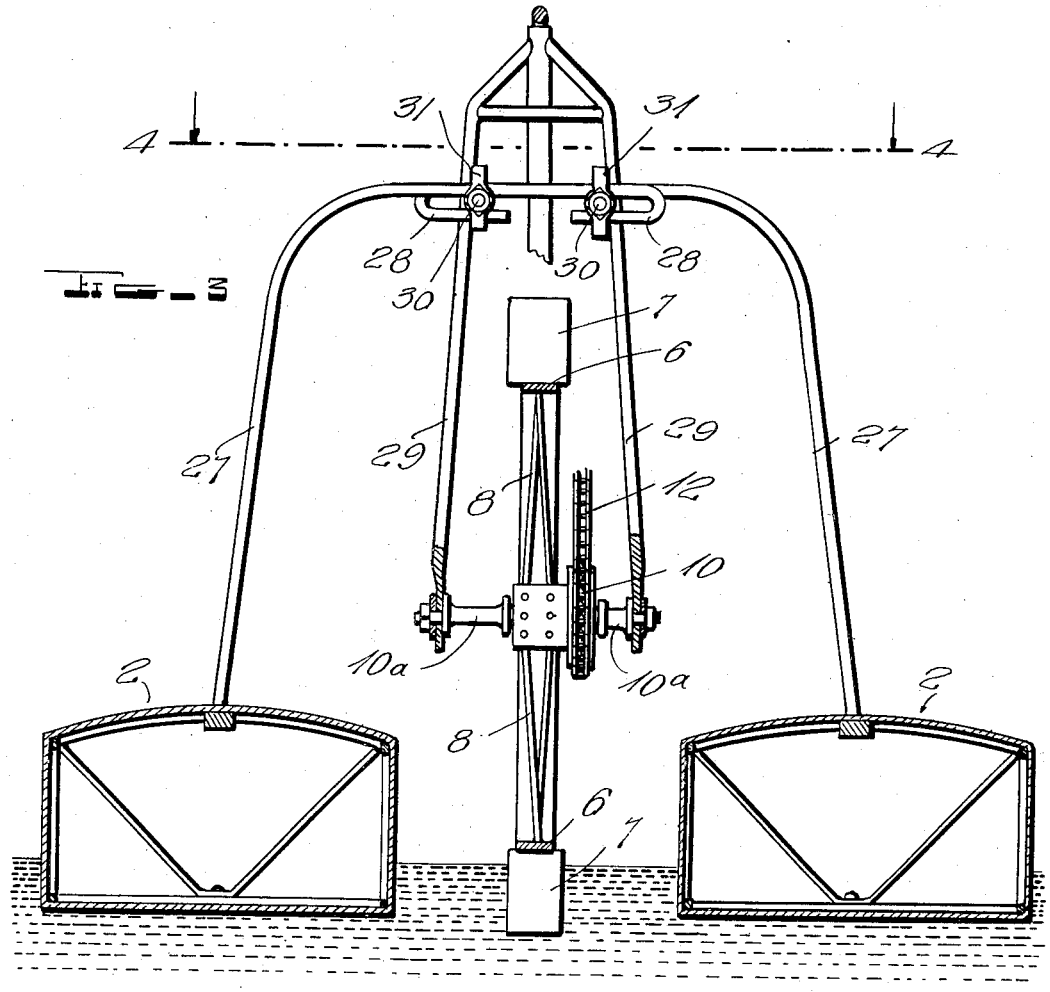
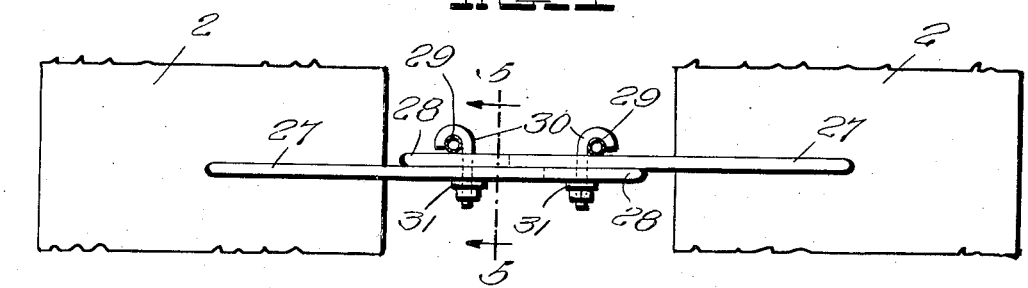
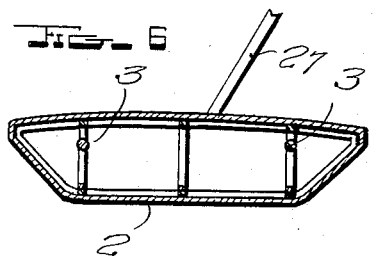
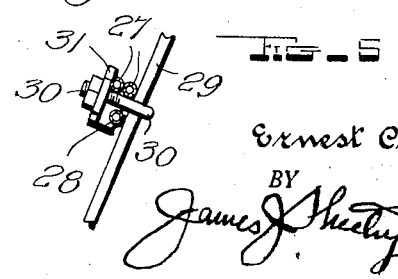

1,920,391

UNITED STATES PATENT OFFICE 1,920,391

WATER BICYCLE

Ernest C. L. Herwig, New Orleans, La.

Application September 7, 1932
Serial No. 632,019
1 Claim. (Cl. 115—27)

This invention relates to a water bicycle and it consists in the novel features hereinafter described and claimed.

An object of the invention is to provide means whereby the usual frame of a bicycle may be mounted upon a series of pontoons and a rider may mount the frame and use the pedals of the bicycle for rotating a propelling wheel which is journaled at the rear portion of the frame and whereby the device is propelled over the surface of a body of water.

The style or pattern of the bicycle frame is immaterial and the pontoons may be filled with air or not as desired as they possess sufficient buoyancy to keep the device afloat. If air is used additional buoyancy is imparted to the pontoons and in the event of leakage the escaping air will disclose the points of leakage at the surfaces of the pontoon.

A further object of the invention is to provide a forward pontoon adapted to be attached to the steering shaft of the bicycle frame and which pontoon is provided with a rudder adapted to guide the device when the steering shaft is turned and the device is being propelled.

Other objects and advantages will be fully understood from the following description and claim when the same are read in connection with the drawings forming part of this specification, in which Figure 1 is a side elevational view of the water bicycle.

Figure 2 is a top plan view of the water bicycle.

Figure 3 is a transverse sectional view of the water bicycle cut on the line of 3—3 of Figure 1.

Figure 4 is a fragmentary detail horizontal sectional view cut on the line 4—4 of Figure 3.

Figure 5 is a similar view cut on the line 5—5 of Figure 4.

Figure 6 is a longitudinal sectional view of one of the rear pontoons used in the structure.

Similar numerals of reference designate corresponding parts in all the views of the drawings.

As illustrated in the accompanying drawings the water bicycle includes a forward pontoon 1 having at its rear end a rudder 1a.

Rear pontoons 2 are connected together by cross rods 3 and the said rear pontoons are spaced and in parallel relation to each other. A bicycle frame indicated in general at 4 is mounted upon the said pontoon and the bicycle frame includes a propelling wheel 5 having a rim 6, radially disposed paddles 7, spokes 8 and a hub 9, a sprocket wheel 10 is mounted upon the rear axle 10a and said axle is fixed to the frame in a usual manner. A forward sprocket wheel 11 is journalled upon the frame 4 and a sprocket chain 12 is trained around the sprocket wheels in the usual manner. Pedals 13 are attached to the forward sprocket wheel. A seat 14 is mounted upon the frame 4. Handle bars 15 are attached to the upper end of a steering shaft 16 turnably mounted in the frame 4 and the lower end of the steering shaft 16 is attached to the intermediate portion of the top side of the forward pontoon 1. A yoke 17 has its branches attached to the intermediate portions of the steering shaft 16 and the shank of the yoke 17 is received in a socket 18 carried by the pontoon 1. A set screw 19 passes through the side of the socket and at its inner end impinges upon the shank of the yoke 17 whereby the said parts are adjustably attached together.

A rod 20 depends from the intermediate portion of the frame 4 and the lower end of the rod 20 is slidably received in a socket 21 which in turn is carried by the forward cross-rod 3.

A set screw 22 passes through the side of the sleeve and engages the rod 20 whereby the said parts are fixed with relation to each other. A rod 24 depends from the frame 4 and is received in a socket 25 carried by the forward cross-rod 3. A set screw 26 passes through the side of the socket 25 and engages the side of the rod 24. By loosening the set screws 19, 22 and 26 the bicycle frame 4 may be raised or lowered with relation to the pontoons and by tightening the said screws the frame 4 is fixed with relation to the pontoons and thus the parts may be adjusted to accommodate the weight of the rider so that the paddle is submerged at the proper depth to engage the water effectively. The paddle wheel 5 is located between the rear pontoons 2. Rods 27 are attached at their lower ends to the top side of the rear pontoons 2 and the said rods are provided at their upper ends with loops 28 which overlap each other and lie against the forks 29 of the rear portion of the frame 4. Bolts 30 are hooked around the forks 29 and pass through the loops and are secured thereto by means of washers and bolts 31 as best illustrated in Figure 4 of the drawings.

As illustrated in Figure 6 of the drawings the pontoons are provided with interiorly located frames preferably of light metal and said frames are covered by casings of sheet metal.

When a rider is mounted upon the seat 14 and the device is upon the surface of a body of water, the rider uses the pedals 13 with his feet to move the connecting parts and rotate the paddle wheel 5. As the lower blades of the said wheel are submerged below the surface of the water the device is driven in a forward direction by the rotation of said paddle wheel. By using the handle bar 15 the shaft 16 may be turned so that the forward pontoon 1 and its rudder 1a are steered or guided and hence the device is caused to move in a desired direction upon the surface of the water.

I claim:—

A water bicycle comprising a frame having a steering shaft and propelling wheels, a forward pontoon attached to the steering shaft, rear pontoons located one at each side of the propelling wheel and attached to the frame, rods connected at their lower ends with the rear pontoons, said rods having loops at their upper ends, said loops overlapping each other and securing devices passing through the loops and attaching said rods to the frame.

ERNEST C. L. HERWIG.